United States Patent
Kurabayashi

(10) Patent No.: US 10,296,068 B2
(45) Date of Patent: May 21, 2019

(54) INFORMATION PROCESSING PROGRAM AND INFORMATION PROCESSING METHOD

(71) Applicant: CYGAMES, INC., Tokyo (JP)

(72) Inventor: Shuichi Kurabayashi, Tokyo (JP)

(73) Assignee: CYGAMES, INC., Tokyo (JP)

( * ) Notice: Subject to any disclaimer, the term of this patent is extended or adjusted under 35 U.S.C. 154(b) by 0 days.

(21) Appl. No.: 16/119,579

(22) Filed: Aug. 31, 2018

(65) Prior Publication Data

US 2018/0373312 A1 Dec. 27, 2018

Related U.S. Application Data

(63) Continuation of application No. PCT/JP2017/002371, filed on Jan. 24, 2017.

(30) Foreign Application Priority Data

Mar. 3, 2016 (JP) .................................. 2016-041048

(51) Int. Cl.
| | | |
|---|---|---|
| *G06F 1/32* | (2019.01) | |
| *A63F 13/25* | (2014.01) | |
| *G06T 1/60* | (2006.01) | |
| *G06T 1/20* | (2006.01) | |
| *G06F 1/3234* | (2019.01) | |
| *G06F 1/3218* | (2019.01) | |

(52) U.S. Cl.
CPC ............ *G06F 1/3265* (2013.01); *A63F 13/25* (2014.09); *G06F 1/3218* (2013.01); *G06T 1/20* (2013.01); *G06T 1/60* (2013.01)

(58) Field of Classification Search
CPC ......... G06T 15/005; G06T 1/20; G06T 15/04; G09G 5/363; G06F 3/14
See application file for complete search history.

(56) References Cited

U.S. PATENT DOCUMENTS

2007/0094519 A1    4/2007  Yamamoto
2010/0272418 A1   10/2010  Kawaguchi
(Continued)

FOREIGN PATENT DOCUMENTS

JP    2002-077377 A    3/2002
JP    2010-258874 A   11/2010
(Continued)

OTHER PUBLICATIONS

Notification of Reasons for Refusal issued in Japanese Application No. 2016-041048, dated May 24, 2016 (3 pages).
(Continued)

*Primary Examiner* — Todd Buttram
(74) *Attorney, Agent, or Firm* — Osha Liang LLP

(57) ABSTRACT

A display control unit executes control to display images requested to be rendered, including effects in a plurality of formats and of a plurality of kinds according to rendering requests, on a display medium via a GPU by using effect data in which the amounts of data have been reduced in accordance with the rendering frequencies of the effects. Specifically, the display control unit determines the amount of data to be reduced for an effect in a format and of a kind according to a rendering request in accordance with the rendering frequency of the effect, extracts the effect data in which data has been reduced by the amount of data from effect-data storage DBs, and provides the effect data to the GPU.

7 Claims, 7 Drawing Sheets

(56) References Cited

U.S. PATENT DOCUMENTS

2011/0109624 A1   5/2011   Greenberg et al.
2016/0110841 A1   4/2016   Kamiyama et al.

FOREIGN PATENT DOCUMENTS

| JP | 2011-060193 A | 3/2011 |
| JP | 2015-180973 A | 10/2015 |
| WO | 2005/038638 A1 | 4/2005 |
| WO | 2015/001754 A1 | 1/2015 |

OTHER PUBLICATIONS

Decision to Grant issued in Japanese Application No. 2016-041048, dated Sep. 20, 2016 (1 page).
International Search Report issued in Application No. PCT/JP2017/002371, dated Apr. 18, 2017 (2 pages).
Written Opinion issued in International Application No. PCT/JP2017/002371, dated Apr. 18, 2017 (4 pages).

FIG. 6

| LOWER LIMIT OF FREQUENCY | UPPER LIMIT OF FREQUENCY | DB |
|---|---|---|
| 0 TIMES | 10 TIMES | NO-DATA-AMOUNT-REDUCTION DB |
| 11 TIMES | 30 TIMES | SMALL-DATA-AMOUNT-REDUCTION DB |
| 31 TIMES | 70 TIMES | INTERMEDIATE-DATA-AMOUNT-REDUCTION DB |
| 71 TIMES | ∞ TIMES | LARGE-DATA-AMOUNT-REDUCTION DB |

INFORMATION PROCESSING PROGRAM AND INFORMATION PROCESSING METHOD

TECHNICAL FIELD

The present invention relates to information processing programs and information processing methods.

BACKGROUND ART

Conventionally, as a power-saving technology for smartphones, a method of reducing power consumption by causing a whole system or a part of the system to enter a standby mode in the case where there are no more tasks to be processed by the system has been widely used (e.g., see Patent Literature Patent document 1: Japanese Unexamined Patent Application, Publication No. 2015-180973

DISCLOSURE OF THE INVENTION

Problems to be Solved by the Invention

However, the conventional method described above is not effective for games in which tasks are executed continuously. Thus, there is a demand for a power-saving technology for smartphones which is effective for games in which tasks are executed continuously.

The present invention has been made in view of the situation described above, and it is an object thereof to establish a power-saving technology for smartphones which is effective for games in which tasks are executed continuously.

Means for Solving the Problems

In order to achieve the above object, an information processing program according to an aspect of the present invention is:

an information processing program for causing a terminal or an information processing device that controls the terminal to execute control processing, the terminal being operated by a player to execute a game in which effects are repeatedly rendered, the terminal including:

a memory that stores individual pieces of data of effects in a plurality of formats and of a plurality of kinds;

a GPU that executes predetermined image processing on image data including data of an effect in a format and of a kind according to a rendering request among the effects in the plurality of formats and of the plurality of kinds; and a display medium that displays an image including the effect in the format and of the kind according to the rendering request on the basis of the result of the image processing by the GPU, the control processing including:

a frequency management step of measuring effect rendering frequencies individually for the plurality of formats and individually for the plurality of kinds and managing the results of those measurements; and a display control step of executing control to display the image including the effect in the format and of the kind according to the rendering request on the display medium via the GPU by using effect data in which the amount of data has been reduced by an amount corresponding to the rendering frequency of the effect.

An information processing method corresponding to the information processing program according to the aspect of the present invention is also provided as an information processing method according to an aspect of the present invention.

Effects of the Invention

The present invention makes it possible to save power for a smartphone in such a manner as to be effective for games in which tasks are executed continuously.

BRIEF DESCRIPTION OF THE DRAWINGS

FIG. 6 is a drawing showing associations between effect rendering frequencies and effect-data storage DBs 81.

PREFERRED MODE FOR CARRYING OUT THE INVENTION

An embodiment of the present invention will be described below with reference to the drawings.

Figure 1:
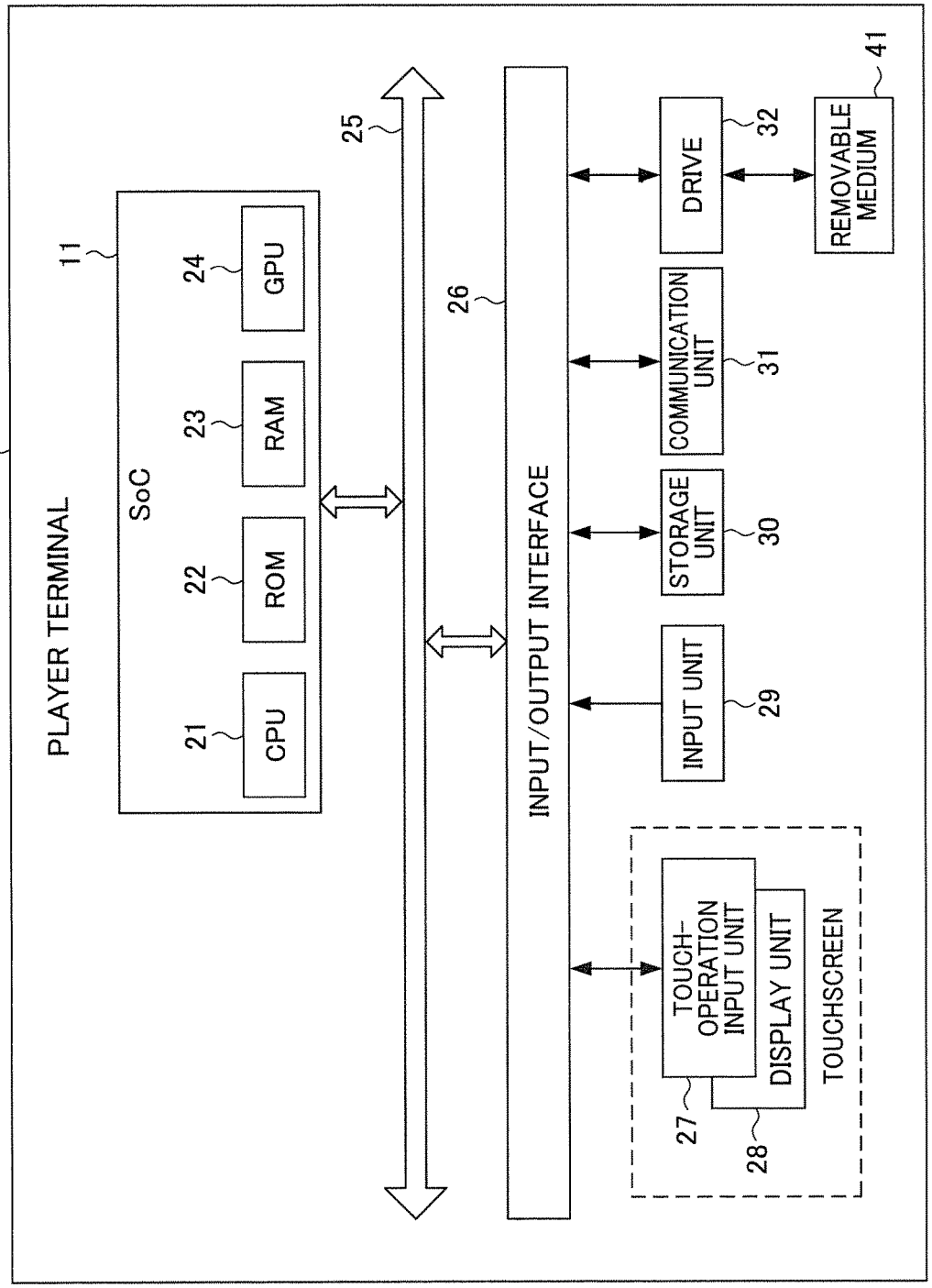
FIG. 1 is a block diagram showing the hardware configuration of a player terminal 1 according to an embodiment of the present invention.

FIG. 1 is a block diagram showing the hardware configuration of a player terminal 1 according to an embodiment of the present invention.

Note that what are simply referred to as "images" hereinafter should be construed to include both "moving images" and "still images."

The player terminal 1 is implemented by a smartphone.

The player terminal 1 includes an SoC (System on a chip) 11, a bus 25, an input/output interface 26, a touch-operation input unit 27, a display unit 28, an input unit 29, a storage unit 30, a communication unit 31, and a drive 32.

The SoC 11 of the player terminal 1 includes a CPU (Central Processing Unit) 21, a ROM (Read Only Memory) 22, a RAM (Random Access Memory) 23, and a GPU (Graphics Processing Unit) 24.

The CPU 21 executes various kinds of processing according to programs recorded in the ROM 22 or programs loaded from the storage unit 30 into the RAM 23.

The RAM 23 also stores, as appropriate, data, etc. that are needed when the CPU 21 executes various kinds of processing.

The GPU 24 executes certain image processing on image data to be displayed on the display unit 28 according to a program recorded in the ROM 22 or a program loaded from the storage unit 30 into the RAM 23. Here, the image data to be displayed on the display unit 28 may include data for effects, which will be described later. Furthermore, examples of the certain image processing include pre-processing before rendering, such as coordinate transformation processing from 3D coordinates into 2D coordinates, as well as final rendering processing.

The input/output interface 26 is also connected to the bus 25, to which the SOC (System on a chip) 11 is connected. The touch-operation input unit 27, the display unit 28, the input unit 29, the storage unit 30, the communication unit 31, and the drive 32 are connected to the input/output interface 26.

The touch-operation input unit 27 is constituted of, for example, capacitive or resistive (pressure-sensitive) position input sensors that are overlaid on the display unit 28 and detects the coordinates of a position at which a touch operation has been performed.

The touch operation here refers to bringing an object into contact with or in proximity to the touch-operation input unit 27. For example, the object that is brought into contact with or in proximity to the touch-operation input unit 27 is a player's finger or a stylus. Hereinafter, a position at which a touch operation has been performed will be referred to as a "touched position", and the coordinates of a touched position will be referred to as "touched coordinates".

The display unit 28 is implemented by a liquid crystal display or the like and displays various images, such as images relating to a game.

In this embodiment, a touchscreen is constituted of the touch-operation input unit 27 and the display unit 28, as described above.

Note that what is referred to as a "display medium" in this description does not simply refer to the display unit 28 but refers to the "touchscreen" constituted of the touch-operation input unit 27 and the display unit 28.

The input unit 29 is constituted of various kinds of hardware buttons, etc. and allows input of various kinds of information in accordance with instruction operations performed by the player.

The storage unit 30 is implemented by a DRAM (Dynamic Random Access Memory) or the like and stores various kinds of data.

The communication unit 31 controls communications carried out with other devices (a server and other player terminals, which are not shown) via a network, including the Internet, which is not shown.

The drive 32 is provided as needed. A removable medium 41 implemented by a magnetic disk, an optical disk, a magneto-optical disk, a semiconductor memory, or the like is loaded in the drive 32 as appropriate. A program read from the removable medium 41 by the drive 32 is installed in the storage unit 30 as needed. The removable medium 41 can also store various kinds of data stored in the storage unit 30, similarly to the storage unit 30.

Through cooperation among the above-described various kinds of hardware and various kinds of software of the player terminal 1 in FIG. 1, it becomes possible to execute a game on the player terminal 1.

Here, the player terminal 1 is implemented by a smartphone, as described earlier, and since tasks are executed continuously during the execution of the game, it is necessary to employ an effective power-saving technology. For this purpose, it is desired to attain power saving for the primary power consumption source of the smartphone.

Thus, the inventor first discovered, through the following experiment, that the primary power consumption source of the smartphone was the GPU 24 and that, in particular, the loads during memory accesses by the GPU 24 resulted in intensive power consumption.

Specifically, the inventor actually measured the loads of the individual constituent elements by using a real smartphone that was applicable as the player terminal 1 and obtained the result that the primary power consumption source of the smartphone was the GPU 24.

Furthermore, in order to clarify the relationship between the load and power consumption of the GPU 24 during the execution of a game, the inventor measured the power consumption of the GPU 24 in relation to the loads thereof in an existing game title. As a presupposition, the inventor set a high-image-quality mode and a low-image-quality mode as settings in the existing game title and compared the power consumptions in the individual modes.

As a result, it was discovered that the frequency of increase in the GPU load was high and the speed of reduction in the remaining battery charge was high in the high-image-quality mode. Meanwhile, it was also discovered that the frequency of increase in the GPU load was low and the speed of reduction in the remaining battery charge was low in the low-image-quality mode.

As described above, it was verified that the element attributable to high power consumption in a smartphone such as the player terminal 1 was the GPU 24.

Here, it is known that the greatest factor in the breakdown of the internal power consumption of the GPU 24 is accesses from the GPU 24 to a memory such as the RAM 23.

This is because the GPU 24 of a smartphone, such as the player terminal 1, is implemented as the SoC 11, in which the GPU 24 is integrated with the CPU 21 and the memory, as shown in FIG. 1. Specifically, in the SoC 11, a memory die is implemented by being stacked on top of a logic die including the CPU 21 and the GPU 24. Accesses to a memory such as the RAM 23 become off-chip accesses and thus consume particularly large amounts of power.

From what has been described above, it is possible to save power effectively for a smartphone, such as the player terminal 1, by reducing accesses from the GPU 24 to the memory during the execution of the game.

Here, the factor attributable to frequent accesses from the GPU 24 to the memory during the execution of the game is graphical effects (shader program or texture), which are frequently rendered in the game.

Therefore, by reducing data in relation to effects that are frequently rendered in the game, thereby reducing the number of memory accesses from the GPU 24 to the memory, it is possible to save power effectively for a smartphone, such as the player terminal 1.

However, since game effects are directly related to the fun and attractiveness of games and have to be presented effectively to players, it is not desirable to reduce data aggressively.

Here, in the case where the player wishes to give higher priority to power saving than to game effects, the player can manual switch off game effects by operating a game setting menu. However, it is often the case that the player (game novice in particular) is not familiar with operating the game setting menu, and it is difficult and laborious to switch the game effects ON/OFF just for power saving.

That is, there is a need for a function for automatically realizing power saving while allowing presentation of attractive graphical effects to the player.

Here, referring to the degree of attention of a player to a graphical effect during game play as the "degree of attention", it is preferable to present graphical effects effectively to the player without reducing the amount of data when the degree of attention is high and to save power by reducing the amount of data for graphical effects when the degree of attention is low.

Figure 2:
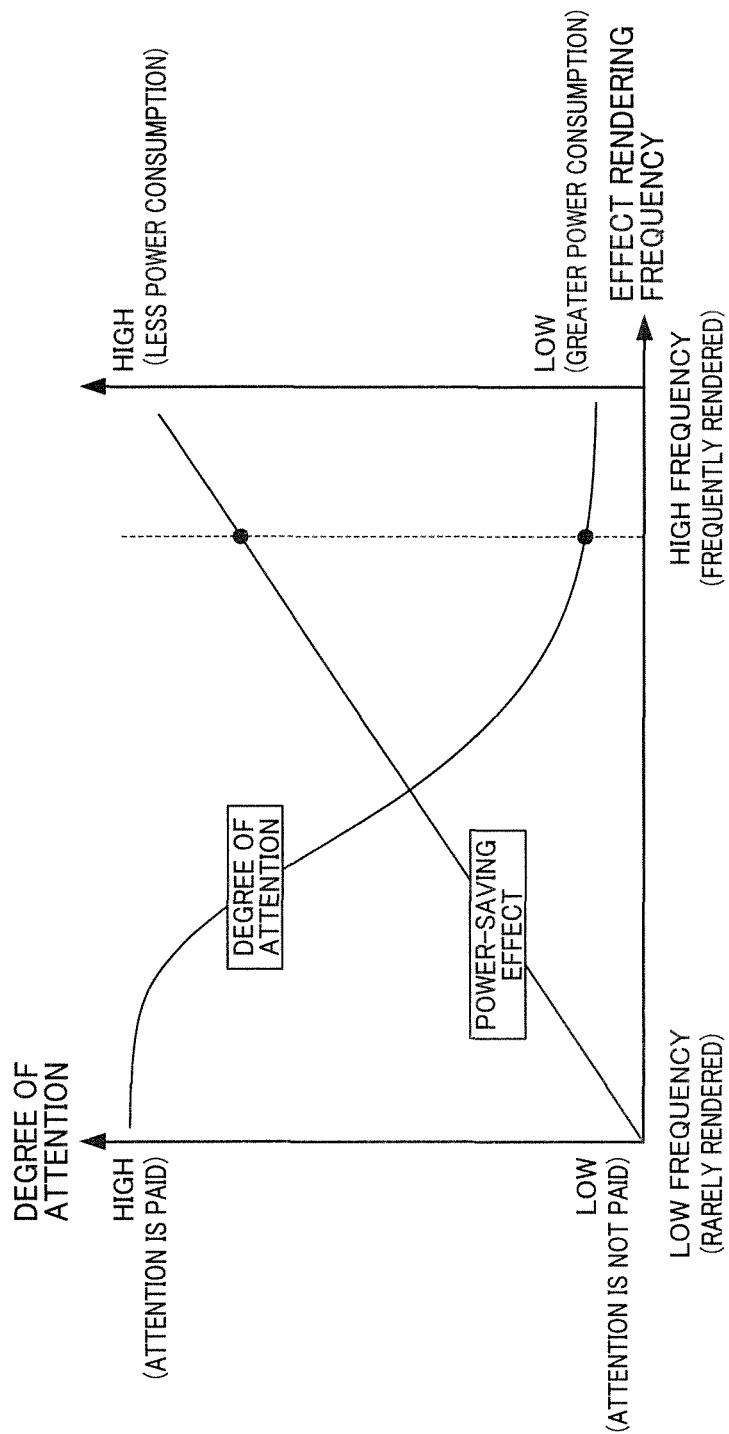
FIG. 2 is a drawing showing the relationship between the degree of attention of a player to an effect and the power-saving effect.

FIG. 2 is a drawing showing the relationship between the degree of attention of the player to effects and the power-saving effect.

In FIG. 2, the vertical axis represents the degrees of attention of the player to the effects, and the horizontal axis represents the rendering frequencies of the effects.

As the rendering frequency of an effect in a game becomes higher, the player sees the effect more frequently and gets bored with the effect, and tends not to pay attention any longer. Thus, the degree of attention becomes lower, as shown in FIG. 2.

Meanwhile, if the rendering frequency of an effect is high, that indicates that the total amount of power consumed for that effect is large. Thus, as the rendering frequency becomes higher, the power-saving effect attained for the effect becomes greater, as shown in FIG. 2.

Thus, the player terminal 1, to which the present invention is applied, saves power by reducing data in relation to effects having rendering frequencies high enough for the player to get bored with and thereby reducing the number of accesses from the GPU 24 to the memory.

Meanwhile, the player terminal 1 renders effects having low rendering frequencies as they are at high image quality without reducing data.

That is, in accordance with the rendering frequencies of game effects, the player terminal 1 automatically executes processing for reducing greater amounts of data for effects as the frequencies thereof become higher.

Accordingly, an advantage is afforded in that it is possible to automatically realize power saving while allowing the presentation of attractive graphical effects to the player. This advantage becomes more prominent when the present invention is applied to a game in which the same effect is rendered repeatedly.

Furthermore, the player terminal 1 can automatically realize power saving without requiring any explicit operation by the player. Therefore, the advantage becomes more prominent when the present invention is applied to a social network game played by a large number of casual players.

Here, the method of reducing data for game effects is not particularly limited and may be arbitrary. For example, the reduction methods shown in FIG. 3 may be applied.

Figure 3:
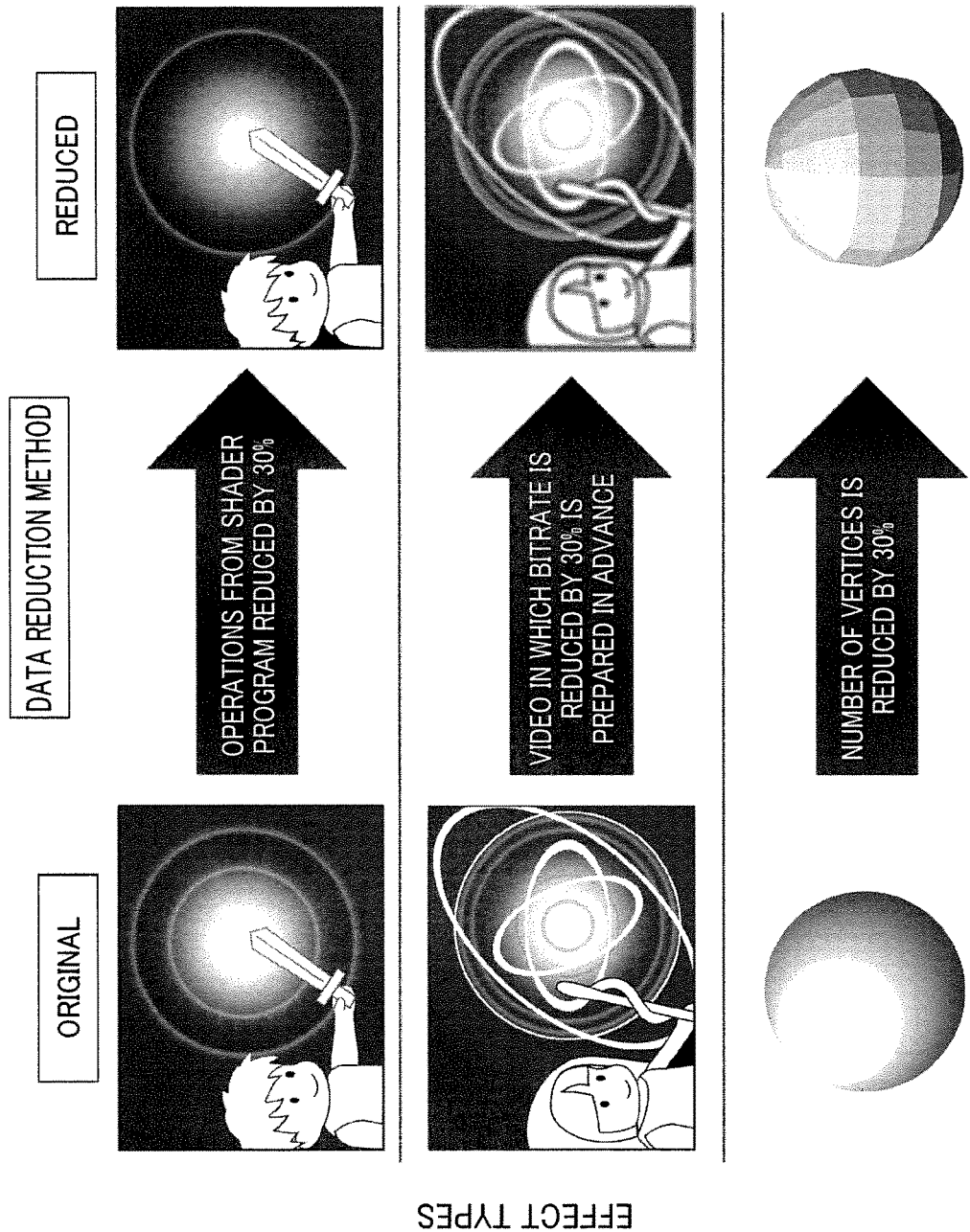
FIG. 3 is a drawing showing specific examples of methods of reducing effect data.

FIG. 3 is a drawing showing specific examples of methods for reducing effect data.

The left images in FIG. 3 are original game screens in which effect data have not been reduced. The right images in FIG. 3 are game screens after effect data have been reduced.

As shown in the upper row in FIG. 3, for example, in the case where the effect format is CSS Shader Effect/OpenGL Shader Effect, which designate instructions to the GPU 24, it is possible to reduce the load of the GPU 24 itself by reducing operations from the shader program by about 30%.

Specifically, by applying the data reduction method shown in the upper row in FIG. 3, although the amount of shading in the graphics of game effects (the amount of light emitted from the sword in the example in FIG. 3) decreases, the number of accesses from the GPU 24 to the memory decreases accordingly, whereby power is saved.

Furthermore, as shown in the middle row in FIG. 3, for example, in the case where effects are implemented in the form of videos, it is possible to reduce the amount of data transfer between the GPU 24 and the memory by preparing videos in which the bitrate has been reduced by about 30% in advance and using the low-bitrate videos.

Specifically, by applying the data reduction method shown in the middle row in FIG. 3, although the image quality of the graphics of game effects is degraded, the number of memory accesses from the GPU 24 to the memory decreases accordingly, whereby power is saved.

Furthermore, as shown in the lower row in FIG. 3, for example, in the case where 3D polygon data is used in the effect format, it is possible to reduce the amount of data transfer between the GPU 24 and the memory by using models in which the numbers of vertices have been reduced by about 30%.

Specifically, by applying the data reduction method shown in the lower row in FIG. 3, although the numbers of vertices in the graphics of game effects decrease, the number of memory accesses from the GPU 24 to the memory decreases, whereby power is saved.

As described above, it is possible to prepare a plurality of kinds of methods as the methods for reducing effect data and to apply suitable kinds of methods for individual formats of game effects. Furthermore, as a data reduction method, a dynamic reduction method using an algorithm may be employed, or data (assets) in which data have been reduced in advance may be prepared.

In this manner, the player terminal 1, to which the invention of the present application is applied, can save power by effectively reducing the number of accesses from the GPU 24 to the memory.

The above-described power-saving method, to which the present invention is applied, is applicable to almost all smartphone GPUs 24.

Furthermore, since this method is a generic power-saving method that does not depend on any specific hardware, the method is applicable to a large number of smartphone platforms.

Furthermore, since only the rendering of effects is controlled in the method, implementation costs can be reduced compared with the conventional power-saving method in which profiles are manually prepared for individual hardware of smartphones or the conventional power-saving method based on firmware that controls the voltage supplied to a GPU or the operating frequency of a GPU.

The above-described series of processing is realized by cooperation between hardware and software at the player terminal 1. In this case, for example, the player terminal 1 has the functional configuration shown in FIG. 4.

Figure 4:
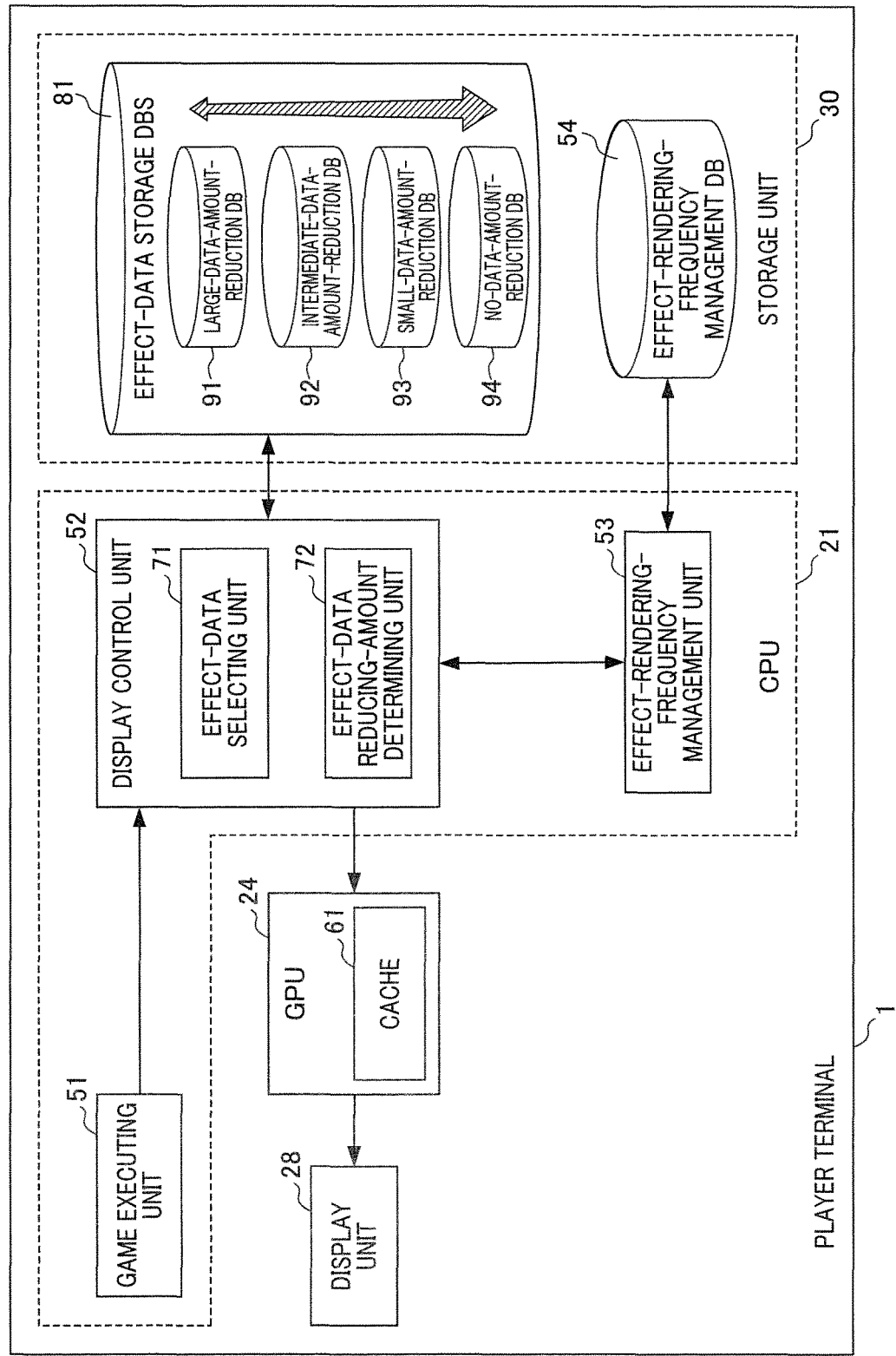
FIG. 4 is a functional block diagram showing an example of the functional configuration of the player terminal in FIG. 1, which is operated by a player to execute a game in which effects are rendered repeatedly.

FIG. 4 is a functional block diagram showing an example of the functional configuration of the player terminal, shown in FIG. 1, that is operated by a player to execute a game in which effects are rendered repeatedly.

As shown in FIG. 4, the CPU 21 of the player terminal 1 functions as a game executing unit 51, a display control unit 52, and an effect-rendering-frequency management unit 53. The display control unit 52 includes an effect-data selecting unit 71 and an effect-data-reducing-amount determining unit 72.

Furthermore, an effect-rendering-frequency management DB 54 and effect-data storage DBs 81 are provided as areas of the storage unit 30. The effect-data storage DBs 81 include a large-data-amount-reduction DB 91, an intermediate-data-amount-reduction DB 92, a small-data-amount-reduction DB 93, and a no-data-amount-reduction DB 94.

Furthermore, the GPU 24 includes a cache 61.

The game executing unit 51 controls the execution of the game and issues requests for rendering effects in a certain format and of a certain kind among effects in a plurality of formats and of a plurality of kinds to the display control unit 52 of the CPU 21 during the execution of the game.

In relation to the effect in the certain format and of the certain kind, requested to be rendered, the display control unit 52 executes control to display a game image including the effect on the display unit 28 via the GPU 24 by using data in which the amount of data has been reduced in accordance with the rendering frequency of the effect.

Specifically, in the case where the data of the effect in the certain format and of the certain kind, requested to be rendered, is stored in the cache 61 of the GPU 24, the display control unit 52 executes control to display a game image including the effect on the display unit 28 by using the effect data existing in the cache 61.

Specifically, the GPU 24 starts rendering by using the effect data stored in the cache 61. In this case, since no access from the GPU 24 to the memory occurs, a considerable power-saving effect is afforded.

Meanwhile, in the case where the data of the effect in the certain format and of the certain kind, requested to be rendered, is not stored in the cache 61 of the GPU 24, the display control unit 52 reads the effect data (asset) in which the amount of data has been reduced from the effect-data storage DBs 81 and supplies the effect data to the GPU 24. Note that the amount of data reduction includes "0", with which the amount of data is not reduced. That is, in the case where power saving is not needed, the display control unit 52 may read the effect data (asset) in which the amount of data has not been reduced from the effect-data storage DBs 81 and supply the effect data to the GPU 24.

Specifically, the GPU 24 starts rendering by using the effect data read from the effect-data storage DBs 81. In this case, although accesses from the GPU 24 to the memory occur, since the amount of data is reduced, the number of accesses decreases accordingly, whereby a power-saving effect is attained.

Here, in this embodiment, as the rendering request that is accepted by the display control unit 52, a rendering request render is adopted. The rendering request render can be defined as render(type, user_id, effect_id).

type represents the effect format. For example, conceivable effect formats include shader program, video stream, and bitmap image.

user_id is an identifier for uniquely identifying the player who has issued the rendering request. Alternatively, user_id may identify the player terminal 1 instead of simply identifying the player so that the rendering frequency for each player terminal 1 can be taken into consideration.

effect_id represents the identifier of the kind of effect to be rendered.

In response to the rendering request described above, the display control unit 52 issues an asset search request find to the effect-data selecting unit 71 or the effect-data reducing-amount determining unit 72. The asset search request find can be defined as find(effect_id, frequency).

effect_id is the same identifier of the kind of effect as used in the rendering request render described above.

frequency is the rendering frequency of the kind of effect.

The effect-rendering-frequency management unit 53 measures the effect rendering frequency for each of the plurality of formats and each of the plurality of kinds and manages the results of those measurements.

Specifically, the effect-rendering-frequency management unit 53 manages effect rendering frequencies by recording the effect rendering frequencies of individual effects separately for each player in the effect-rendering-frequency management DB 54. That is, the effect-rendering-frequency management DB 54 stores data of the rendering frequencies of individual effects for each player.

Alternatively, by aggregating the rendering frequencies of effects for all users, stored in the effect-rendering-frequency management DB 54, the effect-rendering-frequency management unit 53 can determine an initial value of the amount of data reduction for each effect.

Here, the most important feature of the effect-rendering-frequency management unit 53 is that it is possible to measure the effect rendering frequencies in accordance with the charging intervals of the player terminal 1.

In this embodiment, the effect-rendering-frequency management unit 53 obtains records in a predetermined format and stores a set of records obtained for each user as a rendering frequency information record for that user in the effect-rendering-frequency management DB 54.

The effect frequency information record, constituted of a set of records, can be expressed as record:={user_id, effect_id, frequency}.

Here, user_id is the same identifier for uniquely identifying the player as used in the rendering request render described above.

effect_id is the same identifier of the kind of effect as used in the rendering request render described above.

frequency is the rendering frequency of the kind of effect.

In this embodiment, since the effect rendering frequencies are measured for each player as described above, it is possible to realize power saving specialized for a specific individual player.

This makes it possible to automatically realize power saving in accordance with the lifestyle and the game playing style, such as the party constitution, of the individual player.

An important point in the implementation of the present invention is how to determine the timing of initializing the effect frequency information record.

Figure 5:
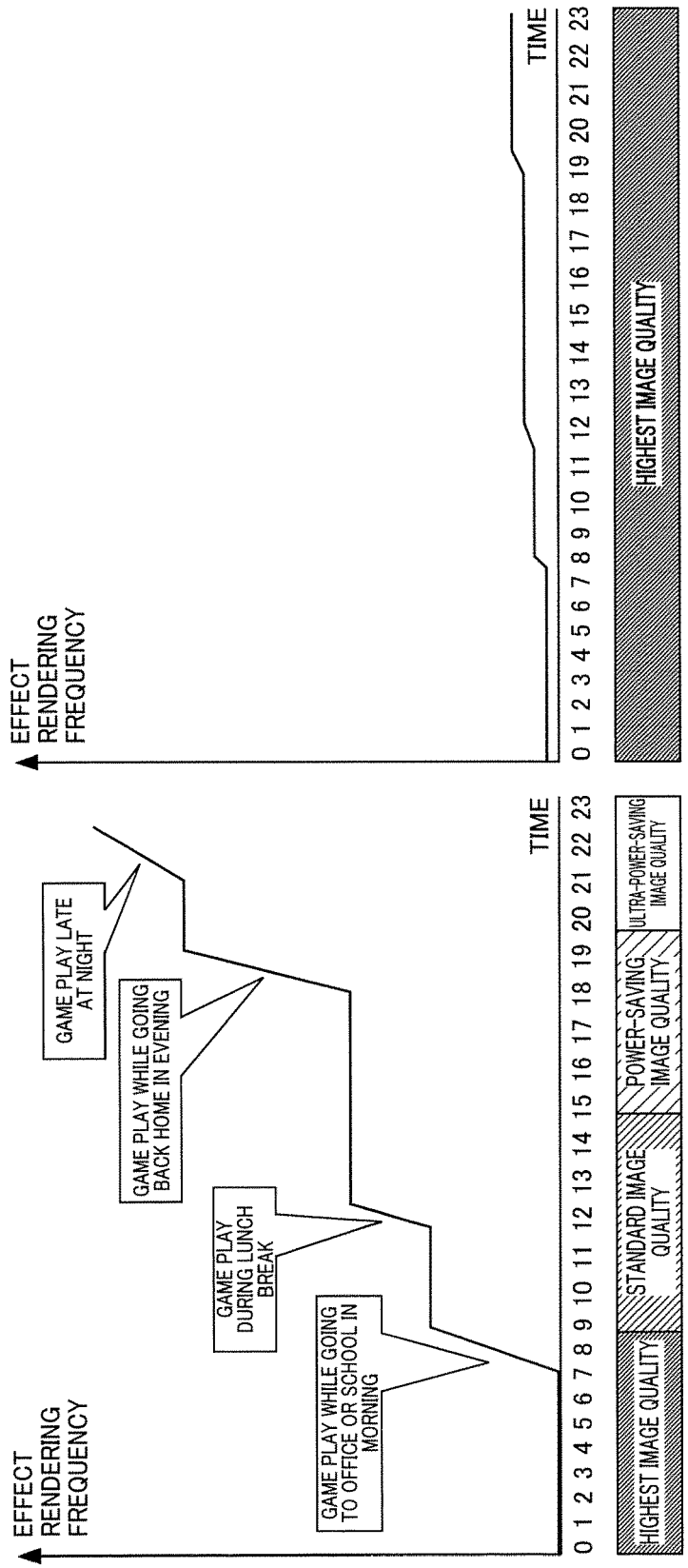
FIG. 5 is a drawing showing effect rendering frequencies in game plays by a player on a daily basis.

An example of suitable timing for initializing the effect frequency information record is the end and beginning of the day, etc., as shown in FIG. 5.

FIG. 5 is a drawing showing the effect rendering frequency in relation to game plays by a player on a daily basis.

In FIG. 5, the vertical axis represents the effect rendering frequency, and the horizontal axis is a time axis representing 24 hours of a day.

In the example in FIG. 5, it is assumed that many players charge their smartphones at the end of each day. Furthermore, the image qualities of effects are classified into four levels, and it is assumed that as the image quality becomes lower, the amount of effect data is reduced, and the power-saving effect becomes more prominent. Specifically, it is assumed that the image qualities of effects are classified into a highest image quality, a standard image quality, a power-saving image quality, and an ultra-power-saving image quality, in that order from higher to lower image qualities.

The left drawing in FIG. 5 shows the rendering frequency of an effect that is rendered at four timings in a day and changes in the image quality of the effect when rendered.

First, when the game is played while the player is going to the office or to school in the morning, the rendering frequency of the effect increases. During this period, since the rendering frequency of the effect has not been accumulated, the effect is rendered at the highest image quality.

Next, the effect is rendered when the game is played during a lunch break or when the game is played when the player is going back home in the evening, and then the image quality of the effect is automatically switched to the standard image quality or the power-saving image quality.

Finally, when the game is played late at night, the rendering frequency is the highest, and thus the effect is rendered at the ultra-power-saving image quality.

The right drawing in FIG. 5 shows the rendering frequency of a highly rare effect that is rarely rendered and changes in the image quality of the effect when rendered.

Since the rendering frequency of the highly rare effect is kept low throughout the day, it is possible to constantly render the effect at the highest image quality.

As described above with reference to FIG. 5, by executing the initialization of the effect frequency information record at the end or beginning of the day and measuring the rendering frequencies of effects on a daily basis, it is possible to automatically and suitably save power in and after the evening, when the remaining battery charge tends to be insufficient. Furthermore, since it is possible to render rarely rendered effects at the highest image quality, the player can experience attractive graphical effects.

Alternatively, as a suitable timing for initializing the effect frequency information record, instead of the end or beginning of the day, described above, the timing at which the state of charge has become 90% or greater may be adopted. That is, in the example in FIG. 5, it is possible to immediately restore the effect image quality to the original highest image quality by charging the smartphone to 90% or greater.

Here, the initialization of the effect frequency information record is a broad concept encompassing decreasing frequency representing the effect rendering frequency to a predetermined value as well as setting it to 0.

That is, by measuring the rendering frequencies of effects in accordance with the charging intervals of the player terminal 1 and automatically applying the operation of reducing greater amounts of effect data in accordance with the rendering frequencies, it is possible to reduce the number of accesses from the GPU 24 to the memory when the effects are rendered. This makes it possible to selectively save power only for effects to which the player does not pay much attention, thereby enhancing the power-saving effect.

Referring back to FIG. 4, the functional configuration of the display control unit 52 will be described in further detail.

When an effect rendering request is issued from the game executing unit 51, the display control unit 52 is invoked to activate the effect-data selecting unit 71 and the effect-data reducing-amount determining unit 72.

Here, when the display control unit 52 is invoked, the asset search request find, described earlier, is used.

In relation to the effect in the format and of the kind according the rendering request, the effect-data selecting unit 71 selects and extracts, from the effect-data storage unit 81, the data in which the amount of data has been reduced in accordance with the rendering frequency of the effect and provides the data to the GPU 24.

In relation to the effect in the format and of the kind according to the rendering request, the effect-data reducing-amount determining unit 72 determines the amount of data to be reduced in accordance with the rendering frequency of the effect.

Formats that can be designated in the rendering request include asset formats in which the amount of data can be reduced in advance (e.g., bitmap data and video data) and asset formats in which the amount of data can be reduced dynamically (e.g., shader program and animation in which the frames to be rendered are controlled on the game engine side).

First, the case where the format of the asset requested to be rendered is an asset format in which the amount of data can be reduced in advance (e.g., bitmap data or video data) will be considered.

In this case, the effect-data reducing-amount determining unit 72 uses an association table preset by the implementer, shown in FIG. 6, i.e., a table of association between effect rendering frequencies and effect-data storage DBs 81 to select a DB having a suitable power-saving performance, thereby determining the amount of data to be reduced as a result.

FIG. 6 is a drawing showing associations between effect rendering frequencies and the effect-data storage DBs 81.

As shown in FIG. 6, in the case where the frequency representing the effect rendering frequency is 0 to 10 times, the effect-data reducing-amount determining unit 72 selects the no-data-amount-reduction DB 94 to determine that the amount of data reduction is "0 (not reduced)".

In the case where the frequency representing the effect rendering frequency is 11 to 30 times, the effect-data reducing-amount determining unit 72 selects the small-data-amount-reduction DB 93 to determine that the amount of data reduction is "small".

In the case where the frequency representing the effect rendering frequency is 31 to 70 times, the effect-data reducing-amount determining unit 72 selects the intermediate-data-amount-reduction DB 92 to determine that the amount of data reduction is "intermediate".

In the case where the frequency representing the effect rendering frequency is greater than or equal to 71 times, the effect-data reducing-amount determining unit 72 selects the large-data-amount-reduction DB 91 to determine that the amount of data reduction is "large".

Here, the effect-data storage DBs 81 are databases that store individual data of effects in a plurality of formats and of a plurality of kinds.

Specifically, in the case where the association table in FIG. 6 is adopted, the effect-data storage DBs 81 may include four classes of databases, namely, the large-data-amount-reduction DB 91, the intermediate-data-amount-reduction DB 92, the small-data-amount-reduction DB 93, and the no-data-amount-reduction DB 94.

Here, the arrow on the right side of the large-data-amount-reduction DB 91, the intermediate-data-amount-reduction DB 92, the small-data-amount-reduction DB 93, and the no-data-amount-reduction DB 94 indicate power consumption. As the amount of data reduction increases, the total amount of memory accesses from the GPU 24 decreases and thus power consumption decreases. Meanwhile, as the amount of data reduction decreases, the total amount of memory accesses from the GPU 24 increases and thus power consumption increases.

The large-data-amount-reduction DB 91 is a database that stores assets in which the amounts of data have been reduced by a "large" amount (e.g., an amount of reduction of about 40%). In the case where the large-data-amount-reduction DB 91 is selected, the image quality of the effect is the ultra-power-saving image quality.

The intermediate-data-amount-reduction DB 92 is a database that stores assets in which the amounts of data have been reduced by an "intermediate" amount (e.g., an amount of reduction of about 20%). In the case where the intermediate-data-amount-reduction DB 92 is selected, the image quality of the effect is the power-saving image quality.

The small-data-amount-reduction DB 93 is a database that stores standard assets in which the amounts of data have been reduced by a "small" amount, e.g., standard assets that have been subjected to a standard data-amount reduction method (a color reduction method or the like). In the case where the small-data-amount-reduction DB 93 is selected, the image quality of the effect is the standard image quality.

The no-data-amount-reduction DB 94 is a database that stores assets with an amount of data reduction of "0" (i.e., the data amounts have not been reduced). In the case where the no-data-amount-reduction DB 94 is selected, the image quality of the effect is the highest image quality.

Although these databases are stored in a secondary storage such as a flash storage, the storage unit 30 in the example in FIG. 4, all these databases may be provided in the memory on the Soc 11. This is because since it is possible to reduce the total amount of data reading regardless of the data storage location, a high power-saving effect can be expected.

As described above, in the case where the format of the asset requested to be rendered is an asset format in which the amount of data can be reduced in advance (e.g., bitmap data or video data), the effect-data reducing-amount determining unit 72 selects a DB having a power-saving performance suitable for the rendering frequency of the effect in the format and of the kind according to the rendering request from among the effect-data storage DBs 81, thereby determining the amount of data reduction as a result.

The effect-data selecting unit 71 extracts the asset of the effect in the format and of the kind according to the rendering request from the DB selected as described above by the effect-data reducing-amount determining unit 72 and provides the asset to the GPU 24.

Next, the case where the format of the effect requested to be rendered is an asset format in which the amount of data can be reduced dynamically (e.g., shader program or animation in which the frames to be rendered are controlled on the game engine side) will be considered.

The effect-data reducing-amount determining unit 72 determines the amount of data reduction for the effect in the format and of the kind according to the rendering request in accordance with the rendering frequency of the effect.

The effect-data selecting unit 71 reads the effect data from, for example, the no-data-amount-reduction DB 94 of the effect-data storage DBs 81, while skipping (decimating) data, thereby reducing the total amount of data reading. The decimation intervals, etc. are determined on the basis of the amount of data reduction determined by the effect-data reducing-amount determining unit 72.

The effect data that has been read while being decimated, i.e., data that has been reduced by the amount of reduction determined by the effect-data reducing-amount determining unit 72, is provided to the GPU 24.

Note that although the database that is read by the effect-data reducing-amount determining unit 72 is the no-data-amount-reduction DB 94 of the effect-data storage DBs 81 in the above-described example, there is no particular limitation to this example. As a preferable example, a database in which effect data is stored in a special format for allowing skipped reading may be adopted.

Next, with reference to FIG. 7, a series of processing steps for rendering a game effect (hereinafter referred to as "effect rendering processing") in the processing executed by the player terminal 1 in FIG. 1 will be described.

Figure 7:
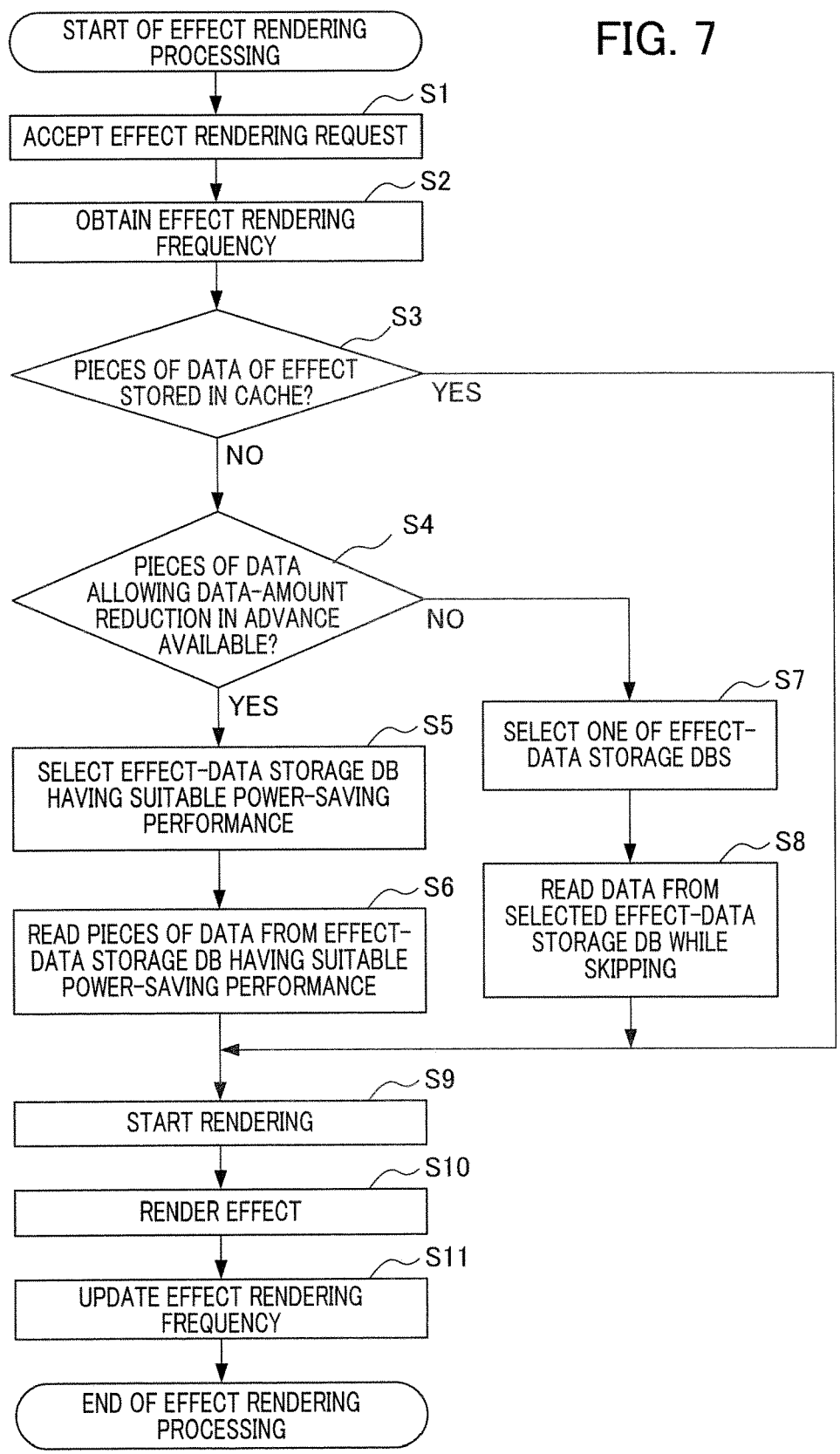
FIG. 7 is a flowchart showing an example of the flow of effect rendering processing.

That is, FIG. 7 is a flowchart for explaining an example of the flow of the effect rendering processing.

The effect rendering processing is started when triggered by the start of game execution.

In step S1, the display control unit 52 in FIG. 4 accepts a request for rendering a game effect.

In step S2, the effect-rendering-frequency management unit 53 obtains the past effect rendering frequency for the effect requested to be rendered. The past effect rendering frequency is stored in the effect-rendering-frequency management DB 54.

In step S3, the display control unit 52 determines whether or not pieces of data of the effect requested to be rendered are stored in the cache 61.

In the case where pieces of data of the effect requested to be rendered are stored in the cache 61, the determination in step S3 results in YES, and the processing proceeds to step S9. Step S9 will be described later.

Meanwhile, in the case where pieces of data of the effect requested to be rendered are not stored in the cache 61, the determination in step S3 results in NO, and the processing proceeds to step S4.

In step S4, the display control unit 52 determines whether or not there are pieces of data in which the amounts of data can be reduced in advance.

In the case where the format of the effect requested to be rendered is an asset format in which the amount of data can be reduced in advance (e.g., bitmap data or video data), considering that there are pieces of data in which the amounts of data can be reduced in advance, the determination in step S4 results in YES, and the processing proceeds to step S5.

In step S5, the display control unit 52 selects one of the effect-data storage DBs 81, having a power-saving performance suitable for the effect rendering frequency obtained through the processing in step S2.

That is, the display control unit 52 selects a database having a suitable power-saving performance from among the large-data-amount-reduction DB 91, the intermediate-data-amount-reduction DB 92, the small-data-amount-reduction DB 93, and the no-data-amount-reduction DB 94.

In step S6, the display control unit 52 reads pieces of data of the effect requested to be rendered from one of the effect-data storage DBs 81, having a suitable power-saving performance.

Then, the processing proceeds to step S9. Step S9 will be described later.

Meanwhile, in the case where the format of the effect requested to be rendered is an asset format in which the amount of data can be reduced dynamically (e.g., shader program or animation in which the frames to be rendered are controlled on the game engine side), considering that there are no pieces of data in which the amounts of data can be reduced in advance, the determination in step S4 results in NO, and the processing proceeds to step S7.

In step S7, the display control unit 52 selects one of the effect-data storage DBs 81, from which data is to be read. For example, the effect-data reducing-amount determining unit 72 selects the no-data-amount-reduction DB 94.

In step S8, the display control unit 52 reads pieces of data of the effect requested to be rendered, while skipping, from the selected one of the effect-data storage DBs 81. Then, the processing proceeds to step S9.

In step S9, the GPU 24 starts rendering by using the pieces of data of the effect, read by the display control unit 52 of the CPU 21 or stored in the cache 61.

In step S10, the GPU 24 renders the effect.

In step S11, the effect-rendering-frequency management unit 53 updates the rendering frequency of the effect rendered through the processing in step S10. The updated effect rendering frequency is written over the effect-rendering-frequency management DB.

Then, the effect rendering processing is terminated.

Although an embodiment of the present invention has been described above, it is to be noted that the present invention is not limited to the above-described embodiment and that modifications, improvements, etc. within a scope in which it is possible to achieve the object of the present invention are encompassed in the present invention.

Furthermore, the above-described series of processing steps may be executed either by hardware or by software.

In other words, the functional configuration in FIG. 3 is only an example, and there is no particular limitation to this example. That is, it suffices that an information processing system be provided with functions that enable the execution of the above-described series of processing steps as a whole, and the choice of functional blocks for implementing the functions is not particularly limited to the example in FIG. 3. Furthermore, the locations of the functional blocks are not particularly limited to those in FIG. 3 and may be arbitrarily set.

Specifically, for example, although the functional blocks shown in FIG. 3 are provided in the player terminal 1 as native applications in the above-described embodiment, the functional blocks may be implemented as Web applications by using HTML and JavaScript (registered trademark) and provided in a server or the like, which is not shown.

Furthermore, each functional block may be implemented by hardware alone, by software alone, or by a combination of hardware and software.

In the case where the series of processing steps are executed by software, a program constituting the software is installed on a computer or the like via a network or from a recording medium.

The computer may be a computer embedded in special hardware. Alternatively, the computer may be a computer that can execute various functions when various programs are installed thereon, such as the player terminal 1 in FIG. 1, a server that is not shown, or a general-purpose smartphone or personal computer.

A recording medium including such a program is implemented by a removable medium (not shown) that is distributed separately from the main unit of an apparatus in order to provide the program to a user, a recording medium that is provided to a user in embedded form in the main unit of an apparatus, etc.

In this description, steps dictated in the program recorded on the recording medium may include not only processing that is executed sequentially in order of time but also processing that is not executed sequentially in order of time but is executed in parallel or individually.

Furthermore, in this description, the term "system" should be construed to mean an overall apparatus constituted of a plurality of devices, a plurality of means, etc.

In other words, an information processing program according to the present invention may be embodied in various forms configured as follows, including the above-described embodiment applied to the player terminal 1.

Specifically, an information processing program according to the present invention is:

an information processing program for causing a terminal (e.g., the player terminal 1 in FIG. 1) or an information processing device that controls the terminal to execute control processing, the terminal being operated by a player to execute a game in which effects are repeatedly rendered, the terminal including:

a memory (e.g., a memory including the effect-data storage DBs 81 in FIG. 4) that stores individual pieces of data of effects in a plurality of formats and a plurality of kinds;

a GPU (e.g., the GPU 24 in FIG. 1) that executes predetermined image processing on image data including data of an effect in a format and of a kind according to a rendering request among the effects in the plurality of formats and of the plurality of kinds; and a display medium (e.g., the touchscreen constituted of the touch-operation input unit 27 and the display unit 28 in FIG. 1) that displays an image including the effect in the format and of the kind according to the rendering request on the basis of the result of the image processing by the GPU, the control processing including:

a frequency management step (e.g., a step executed by the effect-rendering-frequency management unit 53 in FIG. 4) of measuring effect rendering frequencies individually for the plurality of formats and individually for the plurality of kinds and managing the results of those measurements; and a display control step (e.g., a step executed by the display control unit 52 in FIG. 4) of executing control to display the image including the effect in the format and of the kind according to the rendering request on the display medium via the GPU by using effect data in which the amount of data has been reduced by an amount corresponding to the rendering frequency of the effect.

As described above, the computer that executes the program may be not only a terminal such as the player terminal 1 in FIG. 1 but also an information processing device that controls the terminal, i.e., a server that is not shown or a general-purpose smartphone or personal computer.

This makes it possible to save power for a terminal in such a manner as to be effective for a game in which tasks are executed continuously.

Specifically, graphical effects in a game, which involve a large amount of accesses from the GPU 24 to the memory, are one of the primary factors of power consumption for the player terminal 1 executing the game. Meanwhile, although graphical effects in a game directly affect the fun and attractiveness of the game, if the graphical effects are frequently rendered in the game, the player will no longer pay much attention.

Thus, with the program according to the present invention, data of effects are automatically reduced in accordance with the rendering frequencies of the effects to reduce the number of accesses from the GPU 24 to the memory, thereby saving power. Effects for which the amounts of data are considerably reduced at this time are effects to which the player no longer pays much attention. In other words, effects to which the player pays attention are presented at high image quality without reducing the amounts of data.

In this manner, with the program according to the present invention, an advantage is afforded in that it is possible to present attractive graphical effects to a player while automatically saving power.

Furthermore, as a conventional power-saving technology, dynamic voltage and frequency scaling (DVFS) is well known. With DVFS, the voltage supplied to a GPU and the operating frequency of the GPU are dynamically controlled by utilizing system information obtained from the OS, thereby reducing power consumption. DVFS is an effective power-saving method and is widely adopted for smartphone GPUs.

However, since games are a type of software that continuously uses a GPU, it is not possible to achieve sufficient power saving with DVFS alone. Thus, an environment in which a player can play a game without caring about the remaining battery charge has not been realized.

From what has been described above, considering that games are a type of application that is executed continuously for a certain period, power-saving technology that is applicable to games that run on smartphones is an important element. The above-described program according to the present invention makes it possible to realize such technology.

In the program, for an effect in a first format and of a first kind, data in which the amount of data has not been reduced and data in which the amount of data has been reduced in advance may be stored in the memory in advance, and the display control step may include a step of executing the control, in the case where the effect in the first format and of the first kind is requested to be rendered when the rendering frequency of the effect is greater than or equal to a certain value, by using the effect data in which the amount of data has been reduced in advance.

This makes it possible to control power saving more suitably in the case where the first format is an asset format in which the amount of data can be reduced in advance (e.g., bitmap data or video data).

The display control step may include a step of executing the control, in the case where an effect in a second format and of a second kind is requested to be rendered when the rendering frequency of the effect is greater than or equal to the certain value, by executing processing for reducing the data of the effect and using the processed data of the effect.

This makes it possible to control power saving more suitably in the case where the second format is an asset format in which the amount of data can be reduced dynamically (e.g., shader program or animation in which the frames to be rendered are controlled on the game engine side).

The display control step may include a step of executing the control, in the case where the data of the effect in the format and of the kind according to the rendering request exists in a cache of the GPU, by using the data of the effect existing in the cache.

In this case, a very high power-saving effect is attained since accesses from the GPU to the memory do not occur in principle.

Furthermore, the program may further include:

a reducing-amount determining step (e.g., a step executed by the effect-data reducing-amount determining unit 72 in FIG. 4) of determining the amount of data to be reduced for the effect in the format and of the kind according to the rendering request in accordance with the rendering frequency of the effect, and in the display control step, the control may be executed by using the data of the effect in which the amount of data has been reduced by the amount determined in the processing of the reducing-amount determining step (e.g., a step executed by the display control unit 52 in FIG. 4).

Accordingly, a more suitable amount of data reduction is determined, which improves the efficiency of power saving.

Note that "the amount of data reduction" here is a broad concept including an amount that is reduced in advance as well as an amount to be reduced.

Specifically, as described above, formats that can be designated in rendering requests include asset formats in which the amounts of data can be reduced in advance (e.g., bitmap data or video data, the first format described above) and asset formats in which the amounts of data can be reduced dynamically (e.g., shader program or animation in which the frames to be rendered are controlled on the game engine side, the second format described above).

In the case where an effect in the first format is requested to be rendered, by adopting a step of determining a DB storing data (asset) in which the amount of data has been reduced by a predetermined reducing amount from among a plurality of DBs as the reducing-amount determining step, it becomes possible to realize processing equivalent to determining the predetermined reducing amount as the amount of data reduction.

In the case where an effect in the second format is requested to be rendered, it is possible to adopt a step of dynamically determining the amount of data reduction as a reducing-amount determining step.

The terminal may further include a chargeable power supply unit, and the frequency management step may further include a step of controlling the timings of the start and end of measurement of the effect rendering frequencies on the basis of the state of charge of the power supply unit.

In the example described above and shown in FIG. 5, the end and beginning of the day are adopted as the timings of the start and end of measurement of effect rendering frequencies. As described above in the context of the example in FIG. 5, it becomes possible to readily realize power saving specialized for a specific individual. This makes it possible to automatically realize power saving in accordance with a lifestyle or a game playing style, such as a party constitution, of an individual player.

EXPLANATION OF REFERENCE NUMERALS

1 Player terminal
21 CPU
22 ROM
23 RAM
24 GPU
28 Display unit
51 Game executing unit
52 Display control unit
53 Effect-rendering-frequency management unit
54 Effect-rendering-frequency management DB
61 Cache
71 Effect-data selecting unit
72 Effect-data reducing-amount determining unit
81 Effect-data storage DBs
91 Large-data-amount-reduction DB
92 Intermediate-data-amount-reduction DB
93 Small-data-amount-reduction DB
94 No-data-amount-reduction DB

The invention claimed is:

1. A non-transitory computer readable medium storing an information processing program for causing a terminal or an information processing device that controls the terminal to execute control processing, the terminal being operated by a player to execute a game in which effects are repeatedly rendered, the terminal including:

a memory that stores individual pieces of data of effects in a plurality of formats and of a plurality of kinds;

a GPU that executes predetermined image processing on image data including data of an effect in a format and of a kind according to a rendering request among the effects in the plurality of formats and of the plurality of kinds; and a display medium that displays an image including the effect in the format and of the kind according to the rendering request on the basis of the result of the image processing by the GPU, the control processing comprising:

a frequency management step of measuring effect rendering frequencies individually for the plurality of formats and individually for the plurality of kinds and managing the results of those measurements; and a display control step of executing control to display the image including the effect in the format and of the kind according to the rendering request on the display medium via the GPU by using effect data in which the amount of data has not been reduced if the rendering frequency of the effect is within a certain value and by using effect data in which the amount of data has been reduced by an amount corresponding to the rendering frequency of the effect if the rendering frequency is greater than or equal to the certain value.

2. Non-transitory computer readable medium according to claim 1,
wherein, for an effect in a first format and of a first kind, data in which the amount of data has not been reduced and data in which the amount of data has been reduced in advance are stored in the memory in advance, and
wherein the display control step includes a step of executing the control, in the case where the effect in the first format and of the first kind is requested to be rendered when the rendering frequency of the effect is greater than or equal to the certain value, by using the effect data in which the amount of data has been reduced in advance.

3. Non-transitory computer readable medium according to claim 1,
wherein the display control step includes a step of executing the control, in the case where an effect in a second format and of a second kind is requested to be rendered when the rendering frequency of the effect is greater than or equal to the certain value, by executing processing for reducing the data of the effect and using the processed data of the effect.

4. Non-transitory computer readable medium according to of claim 1,
wherein the display control step includes a step of executing the control, in the case where the data of the effect in the format and of the kind according to the rendering request exists in a cache of the GPU, by using the data of the effect existing in the cache.

5. Non-transitory computer readable medium according to claim 1, further comprising:
a reducing-amount determining step of determining the amount of data to be reduced for the effect in the format and of the kind according to the rendering request in accordance with the rendering frequency of the effect if the rendering frequency is greater than or equal to the certain value,
wherein, in the display control step, the control is executed by using the data of the effect in which the amount of data has been reduced by the amount determined in the processing of the reducing-amount determining step if the rendering frequency is greater than or equal to the certain value.

6. Non-transitory computer readable medium according to claim 1,
wherein the terminal further includes a chargeable power supply unit, and
wherein the frequency management step further includes a step of controlling the timings of the start and end of measurement of the effect rendering frequencies on the basis of the state of charge of the power supply unit.

7. An information processing method that is executed by a terminal or an information processing device that controls the terminal,
the terminal being operated by a player to execute a game in which effects are repeatedly rendered, the terminal including:
a memory that stores individual pieces of data of effects in a plurality of formats and of a plurality of kinds;
a GPU that executes predetermined image processing on image data including data of an effect in a format and of a kind according to a rendering request among the effects in the plurality of formats and of the plurality of kinds; and
a display medium that displays an image including the effect in the format and of the kind according to the rendering request on the basis of the result of the image processing by the GPU,
the information processing method comprising:
a frequency management step of measuring effect rendering frequencies individually for the plurality of formats and individually for the plurality of kinds and managing the results of those measurements; and
a display control step of executing control to display the image including the effect in the format and of the kind according to the rendering request on the display medium via the GPU by using effect data in which the amount of data has not been reduced if the rendering frequency of the effect is within a certain value and by using effect data in which the amount of data has been reduced by an amount corresponding to the rendering frequency of the effect if the rendering frequency is greater than or equal to the certain value.

* * * * *